Patented Mar. 6, 1945

2,370,994

UNITED STATES PATENT OFFICE 2,370,994

METHOD OF STABILIZING ASPHALT COMPOSITIONS

Thomas E. Reamer, Albany, Calif., assignor to Shell Development Company, San Francisco, Calif., a corporation of Delaware No Drawing. Application May 23, 1942, Serial No. 444,267

2 Claims. (Cl. 117—27)

The present invention relates to a process of rendering asphalts more stable to the action of light and is particularly concerned with a method of making asphalt roofing in which a granule coating is employed.

Asphalt roofing is usually manufactured by saturating a porous paper called roofing felt with a partially blown asphalt. The excess saturant is scraped off and at least one side of the saturated felt is coated with a thin layer of air-blown asphalt. While the coating is still plastic, crushed-rock granules are deposited thereon and then partially embedded therein by means of a steel roll. The granules are thus held by the asphalt through adhesion of their lower part, while their upper part free of asphalt is exposed to the direct action of atmospheric agents and protects the underlying asphalt from the destructive influence of these agents. The granules may be of crushed slate, feldspar, quartz, or similar material of 10 to 35 mesh, and are generally pre-colored with paints or dyes or coated with ceramic color materials. Prior to embedding, the granules are often lightly coated with a low viscosity petroleum distillate to improve adhesion to the asphalt. Due to the irregular shape of the granules as well as other factors, the impervious coating thus formed is far from perfect and an appreciable part of the asphaltic surface is exposed through the intergranular interstices.

Upon exposure of the roof to direct sunlight for long periods, the unprotected air-blown asphalt between the granules, due to its photosensitivity, tends to combine with the oxygen in the air to form a thin film of brownish oxygenated asphalt often called "rust". Where the granule coating is insufficient or some of the granules are translucent, the blown asphalt between and beneath the granules will become covered with a film of rust, greatly impairing adhesion. Furthermore, the film of rust formed between the granules tends to expand beneath them, thereby undermining their adhesion and weakening the bond between asphalt and granule. Once this bond is sufficiently weakened the granule is easily swept off by wind or rain and the exposed surface of asphalt may be freely attacked by atmospheric agents so that deterioration of the whole roofing proceeds at a greatly accelerated pace.

It has been found that this rust film generally contains 10% to 35% of combined oxygen rendering it somewhat water-soluble. When the roof is then exposed to dew the granules become moist and the water-soluble rust diffuses over the granule, resulting in an objectionable brown color. It has also been noted that after heavy rains occur the soluble materials are washed from the roof and discolor walls and walks. The water-insoluble rust left behind causes poor retention of the granules since it has poor adhesive characteristics.

It has been previously proposed (e. g., in U. S. Patent 2,085,992 to Nelson) to render asphalts stable to light by the addition of anti-oxidants. This method, however, is objectionable because large amounts of expensive inhibitors are required which render the process economically unsound.

It is therefore an object of this invention to lessen the rusting of asphalts which are used in making roofing, particularly of those in which granules are employed. It is a further object of this invention to produce asphalt roofings and the like which have the combined properties of being relatively stable to weathering and the action of light.

Another object is to obtain the greatest effectiveness from a given amount of inhibitor. Still other objects will become apparent from reading the specification.

It has been discovered that even better stability than possible by the above method can be obtained at much less expense by producing a relatively concentrated solution of a suitable oxidation inhibitor in a suitable solvent such as a relatively light mineral oil and using the thus doped oil for coating the granules which are then partially embedded in the asphalt. In this way the inhibitor is concentrated at the asphalt-granule and particularly at the asphalt-granule-air interface, and this prevents rusting where it would do the most harm. The inhibitor also has a tendency to creep over the surface of the asphalt and thus protect the whole surface.

The solvent which is used as a carrier for the oxidation inhibitor is preferably one which is sufficiently fluid to be readily applied to the surface of the granules to be treated and which is normally substantially non-volatile. Thus gas oil, light spindle oils, light lubricating oils, etc., are very suitable. Highly aromatic oils such as extract oils, or stabilized so-called coking cycle stocks and blowdown oils from cracking operations are preferred because of their greater solvent powers for the inhibitors and better compatibilities with asphalts. If desired, high boiling liquid alcohols, ethers, ketones, esters, chlorinated hydrocarbons, etc., may be used instead. Moreover, to increase the solvent powers of suitable high boiling solvents, relatively low boiling mutual solvents may be added such as aromatic hydrocarbons, e. g., benzene, toluene, xylene, tetraline; or ethers as dipropyl ethers, dioxan; or ketones as acetone, methyl ethyl ketone, diethyl ketone; or alcohols as isopropyl alcohols, butyl alcohol, amyl alcohols, etc.

If a mineral oil is selected, its power to increase the bond between the aggregate and the asphalt may be increased by treating it with dimethyl sulfate, other low dialkyl sulfate at a moderately elevated temperature, or other bonding agents such as oily wax amines, described in my copending application, Serial No. 422,131, filed December 8, 1941. Further, if an oil is selected which is too viscous for ready application, it may be heated sufficiently to lower its viscosity to the required degree and applied in the heated condition.

To demonstrate and test for the photosensitivity of an asphalt, a Weather-Ometer may be used. This is simply a chamber containing an arc light, heating and cooling equipment and sprays so that any weather conditions may be simulated. To make the photosensitivity tests, the asphalt to be tested is spread on an aluminum plate and exposed to the arc light while the temperature is maintained constant at 135° F. to 145° F. Successive areas of the asphalt are exposed, and periodically the plate is removed from the machine and sprayed with a dilute alcohol solution. The alcohol "develops" the rust so that it can be more readily seen. In this way, an asphalt can be tested and its resistance to light determined. It is convenient to use a low power microscope, say one of 20 to 30 diameters, to detect more easily the rusting.

It has been found that the source of the crude oil from which the asphalt is made has a great influence on the time of rusting. Generally asphalts from crudes of high asphaltene content such as Mexican type asphalt rust much more readily than asphalts made from crudes of lower asphaltene content, such as Mid-Continent. Thus a Mexican asphalt was found to show visible rusting in six hours in the Weather-Ometer while a similar asphalt from Mid-Continent crude required twenty-four hours under the same conditions to show rust. It should, however, be noted that in general the most stable asphalts toward photosensitivity have poor weather properties, and vice versa. In other words, the Mid-Continent asphalt is not as well suited as Mexican type asphalt for roofing, as it cracks and deteriorates when exposed to heat, cold, rain, etc. The present invention is in a large measure directed to a process of producing asphalt roofing which has both the desired weathering properties and low photosensitivity.

To show the superiority of the present invention over the previous process of adding the inhibitor directly to the asphalt, the following tests were carried out.

Into a Mexican asphalt was thoroughly incorporated ½% of an alkylated catechol and the resulting mixture was placed in the Weather-Ometer with a sample of the same asphalt containing no inhibitor. The sample free from inhibitor had a rust point time of six hours while the sample containing the inhibitor did not give evidence of rust until twelve hours had elapsed.

The experiment was repeated using a solution of 25% of the same alkylated catechol in an S. A. E. 10 lubricating oil. This oil was used to coat roofing granules (about 0.5% of oil by weight of the granules), and the coated granules were impressed in a plate covered with a Mexican type asphalt free from inhibitor so as to be partially embedded therein. The weight of the inhibitor was only 0.04% of the weight of the total asphalt with which this plate was covered. Other granules were coated with the same oil but containing no inhibitor and were impressed in plates covered with the same inhibitor-free Mexican type asphalt and with Mid-Continent asphalt. All plates were tested in the Weather-Ometer. The following results were obtained:

| | Conditions of test | Hours to rust point |
|---|---|---|
| 1 | Granules without inhibitor on Mexican type asphalt | 6 |
| 2 | Granules with inhibitor on Mexican type asphalt | 24 |
| 3 | Granules without inhibitor on Mid-Continent type asphalt | 24 |

From the above the advantages of the present invention are readily apparent. The amount of inhibitor used when coating the granules with oil-inhibitor solution was less than $\frac{1}{12}$ of the amount of the inhibitor incorporated directly into the asphalt, and yet the former had a useful life free from rusting about two times that of the latter.

The inhibitors suitable for the purpose of this invention may be selected from the well-known oxidation inhibitors now used for the prevention of oxidation in gasolines, motor oils, rubber, etc. While the relative susceptibility of different hydrocarbon materials toward different inhibitors varies considerably, most inhibitors which are active in one type of hydrocarbon material have at least some activity in another. The solubility of inhibitor in the solvent selected should be such to enable production of stable solutions containing at least 5% and preferably 10% inhibitor. The various naphthols, amino phenols, alkyl amine phenols, thio dihexenyl amine, amino naphthols, alkylated phenylene diamines, naphthylene diamines and the polyhydroxy-benzene type of inhibitor such as catechol and alkylated catechol, hydroquinone and pyrogallol may be used. It has also been found that copper naphthenate is a very active rust preventive under conditions of this process. Out of this group of suitable rust preventives the following have been found to be particularly suitable because of their superior performance: naphthylene diamines, alkylated polyhydroxy-benzenes, particularly alkylated catechol, and copper naphthenate.

The concentration of the inhibitor in the coating solution should be at least 5% and is advantageously between 5% and 75% (or up to saturation) or preferably from 10% to 50%. This amount is greatly, often by a factor of 1000 or more, in excess of the quantity necessary to prevent the oxidation of the oil itself. The oil is used according to this invention in the double role of a vehicle dissolving and spreading the inhibitor and of an adhesion promoting agent, and thus oils stable against oxidation but stabilized in the conventional manner by the addition of a small quantity of an inhibitor are not suitable for the present purpose.

The amount of solution applied to the granules is conveniently about from 0.1% to 5% by weight of the granules which in normal roofing practice results in asphalt roofing containing less than 0.1% inhibitor by weight of the asphalt.

Due to the non-absorbent nature of the mineral granules, this small amount of oil is sufficient to form a uniform film surrounding the granules and concentrating the inhibitor at the above-defined desired region, i. e., at the granule-asphalt and granule-asphalt-air interfaces.

If desired, the finished roofing may be given a coating of inhibitor solution in lieu of the above procedure. This latter method has, however, the disadvantage that the inhibitor cannot be placed on the asphalt-granule interface so that once the rust starts to spread below the granule there is but little to prevent its spreading and destroying the asphalt-granule bond. A combination of the two above procedures, i. e., precoating of granules and coating of the finished roof, is of course free of this objection but complicates the procedure.

Coating of the asphalt with a concentrated solution of inhibitor prior to embedding the granules is another feasible method of retarding rust formation. It has, however, disadvantages which greatly reduce its effectiveness. Thus, for example, it is more expensive and if the oil is applied to the asphalt alone prior to the application of dry granules, it fails to perform its bonding role effectively, probably because it is absorbed into the body of the asphalt before it can wet the granules, unless excessive quantities are used. Furthermore, commonly used processes and machines for manufacturing asphaltic roofing material are capable of applying the granules but not an oil to the asphalt. This would make necessary the construction of special machinery, which is avoided in my preferred procedure.

It may be also noted that spraying is both a less efficient and more dangerous method of applying a concentrated solution of an inhibitor, because of unavoidable losses of the sprayed droplets and the toxic or irritating nature of many inhibitors.

The granule coating as herein described may also be used as a protective coating for asphalt surfaces generally, and particularly wherever a solid-asphalt-air interface is present and subject to deterioration under the influence of atmospheric agents, such as light, moisture, heat and oxygen, separately or combined.

This application is a continuation-in-part of my copending application, Serial No. 327,031, filed March 30, 1940.

I claim as my invention:

1. In the process of manufacturing asphaltic products whose surface is protected by substantially non-absorbent granules partialy embedded therein, the step of concentrating a highly oil-soluble asphalt oxidation inhibitor in a reactive state at the granule-asphalt and granule-asphalt-air interfaces formed by said granules and the asphalt by coating said granules with a solution of at least 5% of said inhibitor and embedding the coated granules in said surface, said asphalt oxidation inhibitor being selected from the group consisting of alkylated polyhydroxy benzene, copper naphthenate, and naphthylene diamine.

2. The process of claim 1 wherein said inhibitor is an alkylated catechol.

THOMAS E. REAMER.